Aug. 3, 1948.　　　I. T. MINYARD　　　2,446,293
BY-PASS FOR ROTARY MUD SCREENS
Filed Dec. 27, 1944
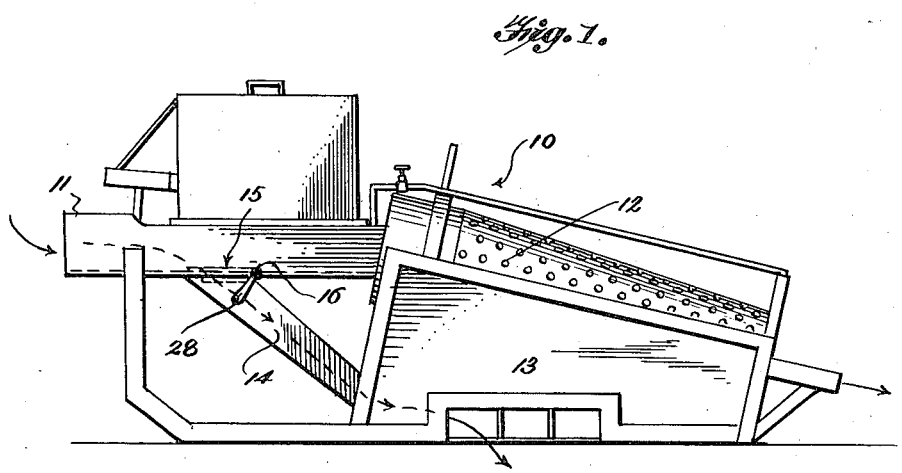
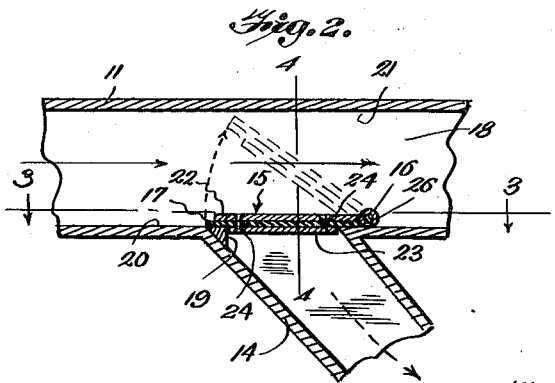
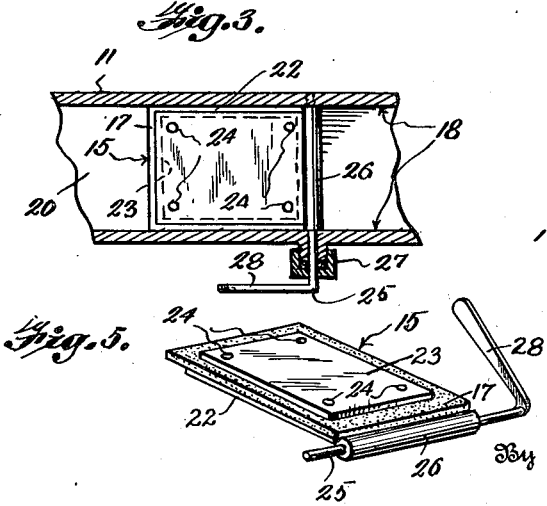
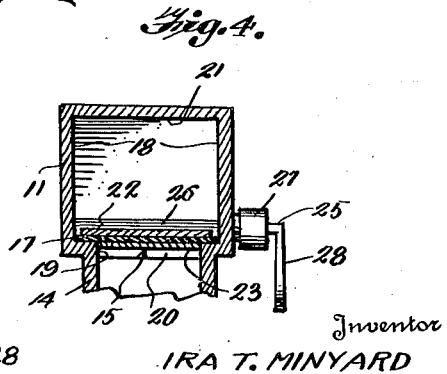
Inventor
IRA T. MINYARD
By Randolph & Beavers
Attorney Patented Aug. 3, 1948

2,446,293

UNITED STATES PATENT OFFICE 2,446,293

BY-PASS FOR ROTARY MUD SCREENS

Ira T. Minyard, Odessa, Tex.

Application December 27, 1944, Serial No. 570,013

4 Claims. (Cl. 210—149)

This invention relates generally to rotary mud screens for cleaning shale and cuttings from the rotary or drilling mud employed in the drilling of oil wells in which the mud is fed into the screen from the drilling unit by a conveyor trough or pipe, hereinafter referred to as the flow line, and thereafter passes through the screen into a receptacle or mud box. More specifically, the present invention is directed to the provision of a by-pass for the flow line whereby the flow of the mud may expeditiously be diverted from the screen and caused to flow directly from the drilling unit to the mud box when it becomes necessary to use hulls, jell flakes, or the like, in order to restore circulation while driling, it being understood that by-passing of the mud is essential in such case as passage of the mud through the screen would remove the hulls or jell flakes therefrom.

Heretofore, drilling operators have found it necessary to remove the screen when the hulls or jell flakes are used in the mud, or to employ expensive valves and lines to cut the flow line completely around the mud screen. Obviously, such methods are time-consuming as well as expensive.

It is also an object of the present invention to provide novel and simple valve means suitable for use with the aforedescribed by-pass and adapted to effect the desired flow of the mud by a simple manipulation of the valve means.

Still other objects and advantages of the invention are those implied from or inherent in the novel construction, combination, and arrangement of parts as will become more clearly apparent as the description proceeds, reference being had to the accompanying drawings in which:

Figure 1 is a plan view of a rotary mud screen which employs a by-pass and valve means therefor according to a preferred embodiment of the invention, Figure 2 is an enlarged fragmentary sectional view illustrating the by-pass and valve means disclosed in Figure 1, Figure 3 is a sectional view as seen along the line 3—3 of Figure 2, Figure 4 is a sectional view taken along the line 4—4 of Figure 2, and Figure 5 is a perspective view of the valve means in an inverted position.

Referring now to the drawings for a more detailed description of the invention and more particularly to Figure 1, the numeral 10 generally designates an oil drilling system or equipment including a conventional tubular flow line 11 to which drilling or rotary mud is supplied and through which the mud normally passes into a rotating screen 12 for removing shale and cuttings therefrom, the mud thereafer passing through the screen and into the mud box or retainer 13.

According to the present invention, a by-pass 14 also is provided which interconnects the flow line 11 and mud retainer or receptacle 13 whereby the mud entering the flow line may be caused to move directly therefrom to the receptacle 13, this by-passing the screen 12.

The mud is caused to flow from line 11 into the screen, or selectively from line 11 into the by-pass 14 under control of valve means generally designated 15 and pivotally disposed at the junction of the flow line and by-pass as at 16.

It will be understood that the flow line 11 and by-pass 14 may be of any cross-section suitable for the purpose, the only requirement being that the valve means 15 be formed in such a manner that when the valve means is in the position shown in full lines in Figure 2, the opening between the flow line and by-pass be closed, and when the valve means is in the dotted line position of Figure 2, that the flow line be completely cut off so as to provide a continuous channel from the flow line through the by-pass only.

As disclosed, flow line 11 is substantially square in cross-section, and, accordingly, the valve means 15 conveniently is formed rectangularly, being comprised of a sheet of rubber 17, or the like, adapted interfittingly to engage the side walls 18 of the flow line and being of sufficient length to seal the opening 19 in the bottom wall 20 of the flow line and to engage the top wall 21 thereof when the valve means is moved about the pivot axis 16 through an angle of approximately forty five degrees.

The sheet of rubber 17 preferably is rigidly supported between a pair of steel plates 22 and 23 which are secured together as by rivets 24 and are formed somewhat smaller than the rubber sheet whereby the edges thereof extend beyond the edges of the plates thereby to permit the sheet yieldably to engage the walls of the flow line and thus provide a sealed connection therebetween.

A rod 25 provides the pivot for the valve means and extends through and is secured to a tubular member 26 which preferably is welded or otherwise suitably secured to plate 22 along one edge thereof, substantially as shown. Rod 25 conveniently is journaled in the side walls 18, a packing gland preferably being provided as at 27 and the rod at that side being bent at right angles to provide a handle 28 whereby the valve means may be rocked about the pivot axis 16. Thus, in use, when it is desired to divert the mud from the screen and cause it to flow to the mud box directly, it merely is necessary to manipulate handle 28 upwardly sufficiently to completely close the flow line.

While the invention has been described with respect to a specific structural embodiment thereof, it will be understood by those skilled in the art that the invention is susceptible of additional embodiments without departing from the spirit or scope of the invention as defined by the appended claims.

Having thus described the invention, what is claimed is:

1. In an oil drilling system of the character disclosed, the combination of a rotary mud screen, a flow line for conducting or feeding drilling mud into the screen, a mud receptacle for normally receiving the mud which passes through the screen, a conduit connected to the flow line and receptacle and forming a by-pass for feeding the mud directly from the flow line to the receptacle, a two position valve means disposed within the flow line at the junction of the by-pass therewith and operative, when in the first position thereof, to close the entrance end of the by-pass to prevent flow of mud into the by-pass and operative, when in the second position thereof, to close the flow line, between the by-pass and screen, to prevent flow of mud from the flow line into the screen and to direct the mud into the by-pass, and means disposed exteriorly of the flow line and in operative connection with said valve means for moving the same between said first and second position at will.

2. In an oil drilling system of the character disclosed, the combination of a rotary mud screen, a flow line for conducting or feeding drilling mud into the screen, a mud receptacle for normally receiving the mud which passes through the screen, a conduit connected to the flow line and receptacle and forming a by-pass for feeding the mud directly from the flow line to the receptacle, a two position valve means disposed within the flow line at the junction of the by-pass therewith and adapted when in the first position thereof to close the entrance end of the flow line to prevent flow of mud into the by-pass and adapted when in the second position thereof to close the flow line, between the by-pass and screen, prevent flow of mud from the flow line into the screen, said valve means comprising first and second spaced plates and a rubber sheet disposed therebetween and extended beyond the edges thereof whereby the rubber sheet serves yieldably to seal the flow line and the entrance end of the by-pass selectively, a rod secured to one of said plates and disposed transversely of the flow line and pivotally supported therein for providing pivotal movement of the valve means between the two positions thereof, and crank means disposed exteriorly of the flow line and operatively connected to said rod for manually moving the valve means between the two positions thereof.

3. In an oil drilling system, in combination with a flow line for feeding drilling mud, a screen into which the flow line discharges and a receptacle for receiving the mud from the screen; a conduit connected to the flow line and receptacle and forming a by-pass around the screen from the flow line to the receptacle, and a valve mounted in the flow line for alternately closing the entrance end of the by-pass and the discharge end of the flow line, between the by-pass and screen.

4. In an oil drilling system of the character disclosed, the combination of a mud screen, a main conduit for conducting or feeding drilling mud into the screen, a mud receptacle for normally receiving the mud which passes through the screen, a by-pass conduit for feeding the mud directly from the main conduit to the mud receptacle, and a valve located in the main conduit for closing the entrance end of the by-pass conduit for causing the mud to flow from the main conduit to the screen, said valve being movable to a position to close the main conduit, between the by-pass conduit and screen, for causing the mud to flow from the main conduit through the by-pass directly to the receptacle.

IRA T. MINYARD.

REFERENCES CITED

The following references are of record in the file of this patent:

UNITED STATES PATENTS

| Number | Name | Date |
|---|---|---|
| 1,903,774 | Burrell | Apr. 18, 1933 |
| 2,329,295 | Reagan | Sept. 14, 1943 |